United States Patent [19]
Johnson et al.

[11] Patent Number: 5,542,077
[45] Date of Patent: Jul. 30, 1996

[54] PERSONAL COMPUTER WITH CMOS MEMORY NOT HAVING A SEPARATE BATTERY

[75] Inventors: Drew S. Johnson, Houston; Randall L. Hess, Cypress; Patrick R. Cooper, Houston, all of Tex.

[73] Assignee: Compaq Computer Corporation, Houston, Tex.

[21] Appl. No.: 119,691

[22] Filed: Sep. 10, 1993

[51] Int. Cl.⁶ ............................................. G06F 1/26
[52] U.S. Cl. .................. 395/750; 364/273.5; 364/DIG. 1
[58] Field of Search .................................... 395/750, 575, 395/425, 700, 427, 750; 364/707; 365/226, 227, 229; 371/66; 307/66

[56] References Cited

U.S. PATENT DOCUMENTS

| | | | |
|---|---|---|---|
| 4,984,149 | 1/1991 | Iwashita | 395/425 |
| 5,022,077 | 6/1991 | Bealkowski et al. | 380/4 |
| 5,056,001 | 10/1991 | Sexton | 395/275 |
| 5,075,841 | 12/1991 | Kaneko | 395/575 |
| 5,121,359 | 6/1992 | Steele | 365/229 |
| 5,177,371 | 1/1993 | Faulk | 307/66 |
| 5,204,840 | 4/1993 | Mazur | 365/228 |
| 5,216,631 | 6/1993 | Sliwa, Jr. | 365/174 |
| 5,237,687 | 8/1993 | Okamato et al. | 395/700 |
| 5,247,659 | 9/1993 | Curran et al. | 395/575 |

OTHER PUBLICATIONS

INTEL, *Memory Products*, Sep. 1992, pp. 3–117 To 3–145.

*Primary Examiner*—Gopal C. Ray
*Attorney, Agent, or Firm*—Pravel, Hewitt, Kimball & Krieger

[57] ABSTRACT

A computer system which utilizes a CMOS memory/RTC and does not have a separate battery for powering the CMOS memory/RTC. A serial EEPROM is utilized to maintain the contents of the CMOS memory. When the computer is entered into a setup mode and the CMOS information is to be saved, it is saved to both the CMOS memory and to the serial EEPROM. Upon booting up, a check is made to see if the CMOS memory has not lost data. If it has, then the copy stored in the serial EEPROM is retrieved and utilized. In a second embodiment, a flash EEPROM used to store the BIOS of the computer also stores this information. The flash EEPROM is a type where the EEPROM is divided into several partitions and each can be programmed independently of the others. The partition of the flash EEPROM used for the CMOS information is originally erased. The partition is sufficiently large to contain numerous copies of the CMOS data. Copies of the CMOS data are sequentially stored. If the partition should become filled up, then an erase cycle is performed and the CMOS data is written as the first copy. If upon booting the computer indicates that the CMOS memory is not trustworthy, then the partition is scanned until erased state of data is obtained, at which time the pointer is decremented to obtain the last copy of the stored CMOS data and this is restored for operation.

12 Claims, 9 Drawing Sheets

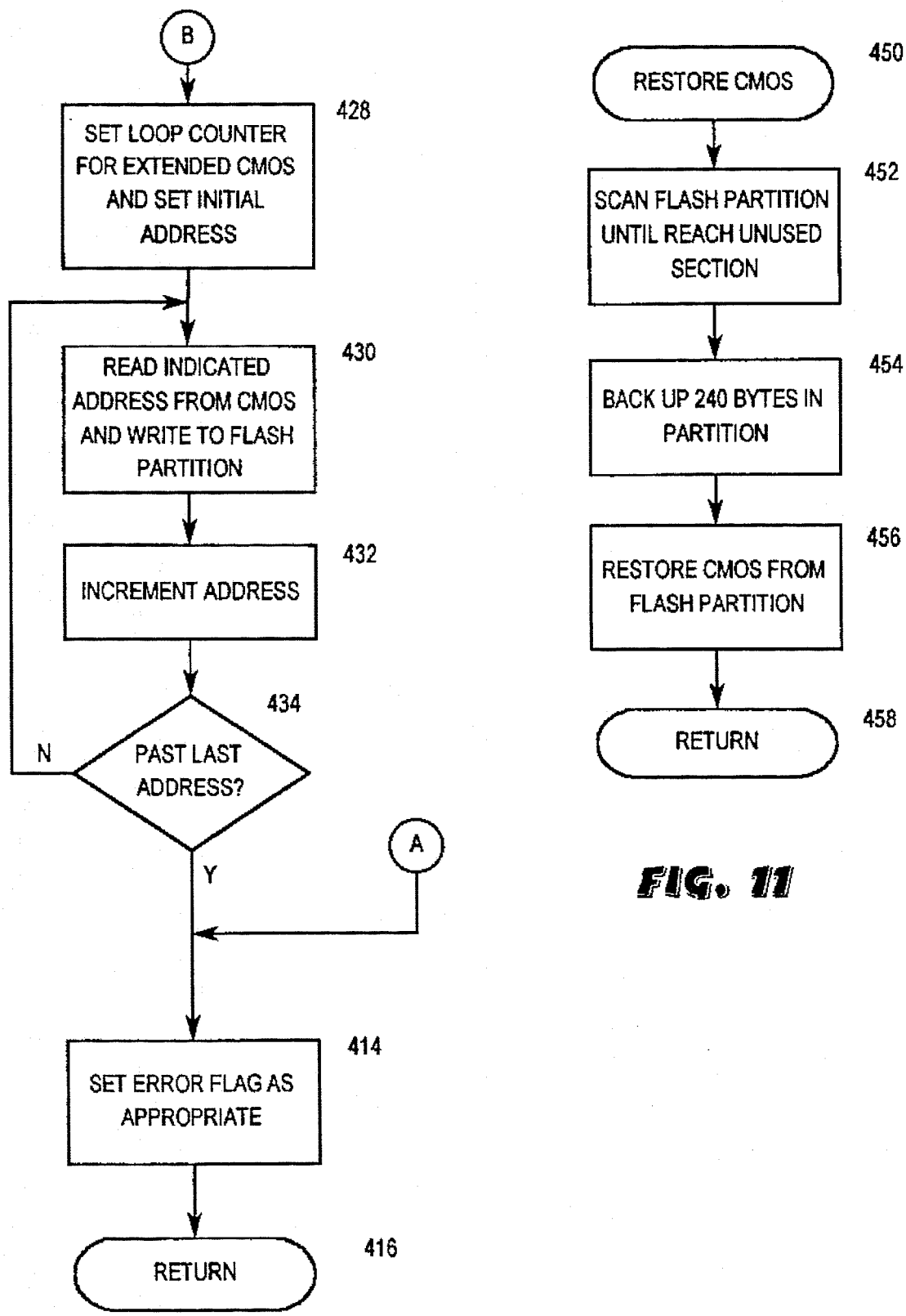

PERSONAL COMPUTER WITH CMOS MEMORY NOT HAVING A SEPARATE BATTERY

BACKGROUND OF THE INVENTION

1. Field of the Invention

The invention relates to personal computers having CMOS memory for storing basic system configuration parameters, and more particularly to battery powered personal computers which do not have a separate battery to power the CMOS memory.

2. Description of the Prior Art

When International Business Machines Corp. (IBM) introduced the PC/AT, its second major generation of personal computers, one of the components in the computer was a small CMOS memory/real-time-clock (RTC) unit. This component was used to provide time keeping functions and to provide storage of configuration parameters, such as the type of floppy disk drive, the amount of memory, and so on when the computer was turned off, so that when the computer was next turned on, the configuration information was readily available to ease initialization in startup of the system and the time was accurate so that user entry was not required. The CMOS memory/RTC unit was powered by a separate battery which powered only that unit when the computer was turned off. When the computer was turned on, the main power supply provided the power. Because of the separate battery, power could be maintained to the CMOS memory/RTC unit even while the computer was turned off. This allowed the storage and time keeping to continue.

As personal computers developed, variations included portable and, ultimately, laptop and notebook computers. These computers generally contain the functions of the desktop systems. For example, they include hard drives, large amounts of memory and many additional options and new features. These additional functions required the storage of additional configuration information, so that the original CMOS memory area was quickly filled up and an extended CMOS memory area was utilized. The goal of portable computers was always reduced size and weight, to allow improved portability. Thus space and weight are at a premium, as well as cost. Therefore there is always a desire to eliminate components to save space, weight and cost.

One major characteristic of the portable computers was that when they reached laptop and notebook size they were usually battery powered. This allowed them to be operated remotely and greatly increased their flexibility. However, battery life was often relatively short, so that frequent charging was needed or the computer would become unusable. In addition, the batteries were almost always removable, allowing multiple battery packs to be utilized if an extended duration was required away from a power source. While this use of multiple battery packs extended the operating time, the need to change batteries always seemed to occur in the middle of program operation, so it was desirable to keep the computer in its operating state, or at least in some operating state wherein the program and data memory was not lost, while the batteries were changed. To this end small auxiliary batteries were placed in the notebook computers so that they could power the system for a very short time, often at reduced power levels, while the main battery was replaced. When the new main battery was installed, the computer was brought back to full operation and the user could continue activities.

During this evolution, the battery for the CMOS memory/RTC unit remained in the computer. But this CMOS battery added expense and weight and took up space and at first blush would be considered not necessary, as there were already two other batteries in the computer anyway. It would appear straightforward to simply remove the CMOS battery and allow the other two batteries to power the CMOS memory/RTC portion. The problem with this was that, as noted above, the main battery is often removed for replacement. In such a case, the auxiliary battery might very well be in a discharged state. Alternatively, both batteries might be discharged after an extended period of non-use. In either case, then all data in the CMOS memory/RTC unit would be lost. The user would then have to completely go through setup and configuration of the computer system as if it were newly obtained. This would be quite troublesome for numerous reasons. First, in the battery removal case it would occur as yet an additional problem when the basic program being executed had just been lost because of the low battery problems. Second, it is a time consuming process as the number of configuration items has grown quite large. Third, the actual user in many cases does not know the settings in the computer. The computer would have been set up by a knowledgeable individual and given to the user in a configured mode. The user will have no idea of what most of the items are, so frustration will increase. To avoid these problems, it was previously considered necessary to retain the additional battery for the CMOS memory/RTC unit, even though it took up precious space inside the laptop computers and added to the cost and weight. Therefore it would be desirable to develop some technique wherein this CMOS battery could be removed and yet abate the concern about potential loss of configuration information should the main battery be removed and the auxiliary battery be discharged.

SUMMARY OF THE PRESENT INVENTION

A computer system according to the present invention utilizes a CMOS memory/real-time-clock (RTC) unit, preferably contained in a larger integrated circuit, and yet does not have a separate battery for powering the CMOS memory/RTC unit. Two alternative arrangements are preferred. In the first, a serial EEPROM is utilized having sufficient capacity to maintain the contents of the CMOS memory. Each time the computer is entered into a setup mode, either for conventional information or for power conservation related information, as the preferred embodiment is implemented in a notebook computer, when the CMOS information is to be saved, it is saved to both the CMOS memory and to the serial EEPROM. The serial EEPROM retains its contents without power of any type and therefore provides the backup storage necessary should power be removed from the CMOS memory. Upon booting up of the computer according to this embodiment, a check is made to see if the CMOS memory is operational and has not lost data. If it has, then the copy stored in the serial EEPROM is retrieved and utilized.

In a second embodiment, a flash EEPROM used to store the various core operating routines or BIOS of the computer is also used to store this information. Preferably the flash EEPROM is a type referred to as a boot block EEPROM, where the EEPROM is divided into several partitions and each can be programmed independently of the others. In this embodiment, it is desirable to reduce the number of programming cycles for numerous reasons. To obtain this desired result, the partition of the flash EEPROM used for the CMOS information is originally erased. The partition is sufficiently large to contain numerous copies of the CMOS data. To reduce the number of erase cycles, the copies of the CMOS data are sequentially stored. For example, the first time the CMOS data is provided starting at the first memory location. The next time the CMOS data needs to be saved, it is provided to the locations immediately after the first saved copy. By doing this, numerous copies can be stored without requiring an erase cycle. Therefore in the computer according to this embodiment, each time the CMOS information is to be saved, it is written to the partition reserved for the CMOS data in the EEPROM, but after all prior copies. If the partition should become filled up, then an erase cycle is performed and the CMOS data is written as the first copy. If upon booting the computer indicates that the CMOS memory is not trustworthy, then the partition is scanned until erased state of data is obtained, at which time the pointer is decremented to obtain the last copy of the stored CMOS data and this is restored for operation.

In these two manners, there is no need for a separate battery to power the CMOS memory/RTC and yet data will not be lost even if the main battery is removed and the auxiliary battery is discharged.

BRIEF DESCRIPTION OF THE DRAWINGS

A better understanding of the present invention can be obtained when the following detailed description of the preferred embodiment is considered in conjunction with the following drawings, in which:

FIGS. 10A and 10B are flowcharts of an alternative embodiment of INT 15 wherein the CMOS data is stored in a partition in the flash EEPROM of FIG. 1; and FIG. 11 is a flowchart of an alternative embodiment of a restore CMOS sequence utilized when the CMOS data is stored in the flash EEPROM of FIG. 1.

DETAILED DESCRIPTION OF THE PREFERRED EMBODIMENTS

Figure 1:
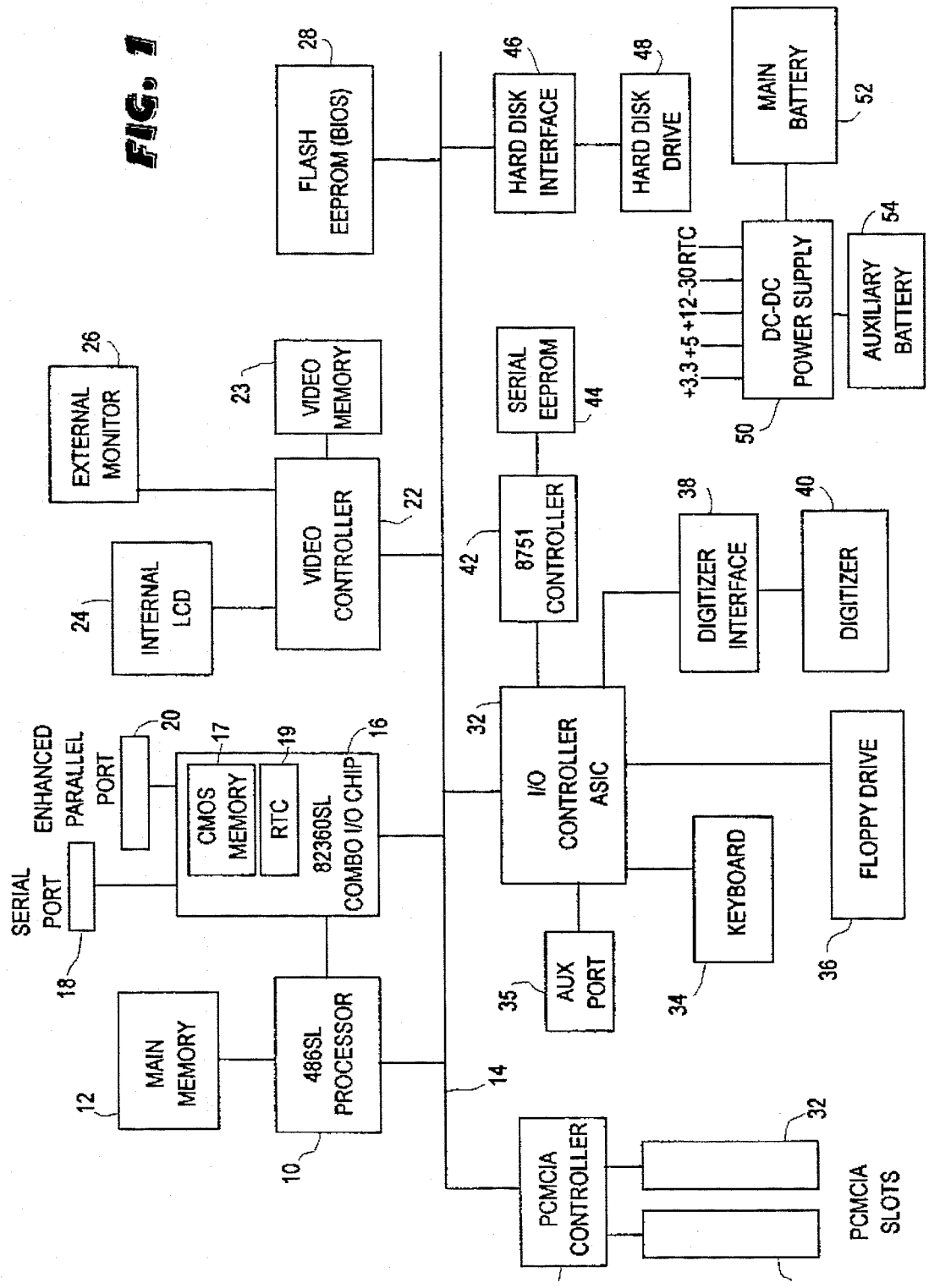
FIG. 1 is a block diagram of a notebook computer according to the present invention.

Proceeding now to FIG. 1, a computer C according to the present invention is shown. A microprocessor 10, preferably the 486SL processor from Intel Corporation (Intel), forms the main computing element of the computer C. Main memory 12 is connected to the processor 10 over a memory bus. A bus 14 is connected to the processor 10 and includes address, data and control portions to form a main communication bus to the various components in the computer system C. One such component is a combination I/O chip 16, preferably the 82360SL from Intel. A separate connection preferably is made between the processor 10 and the combo I/O chip 16 to provide the special connections between the 486SL and the 82360SL. A serial port 18 and an enhanced parallel port 20 are provided from the combo I/O chip 16. Of particular interest in this description are the CMOS memory 17 and real time clock (RTC) 19 which are contained in the combo I/O chip 16. The CMOS memory 17 provides both the standard CMOS memory area of IBM-compatible PCs and the extended CMOS memory area. Ordinarily a separate battery is to be connected to the combo I/O chip 16 to provide back up power to the CMOS memory 17 and the RTC 19. It is specifically noted that in the computer system of Figure C a separate battery is not connected to those components. A video controller 22 is connected to the bus 14 to receive commands from the processor 10 and video memory 23 is connected to the video controller 27. An internal liquid crystal (LCD) display 24 is connected to the video controller 22 and in certain cases an external monitor 26, typically a CRT, can be connected to the video controller 22 as desired.

As the computer system C must contain certain basic operating routines to allow the computer to boot and to perform certain fundamental system functions, these routines being generically referred to as the BIOS, a flash EEPROM 28 is connected to the bus 14. In a first embodiment the flash EEPROM 28 is a simple bulk flash EEPROM, in which the entire device is erased at the same time. In a second embodiment, the flash EEPROM 28 is a boot block device or other variation of a flash EEPROM which is erasable in individual partitions. Not shown for clarity are the necessary connections to allow programming and erasing to occur as these are well known to those skilled in the art. A PCMCIA controller 30 is connected to the bus 14 and in turn has two PCMCIA slots 32 connected to it. The PCMCIA slots 32 provide expansion capabilities for the computer system C to provide additional memory if desired or to receive certain communications options, such as modems and network cards.

An I/O controller application specific integrated circuit (ASIC) 32 is connected to the bus 14. The I/O controller ASIC 32 provides numerous special functions in the computer C. One of those is to provide keyboard scanning logic to allow direct scanning of a keyboard 34 so that a separate controller is not required. The I/O controller ASIC 32 contains the necessary shift registers and clock logic to allow connection of a pointing device to an auxiliary port 35. In addition, the I/O controller ASIC 32 contains the necessary interfaces to connect to a floppy drive 36 and to a digitizer interface 38. The digitizer interface 38 is in turn connected to a digitizer 40 to allow pen input information to be utilized in the computer system C. The I/O controller ASIC 32 also preferably includes various registers to allow it to be used in combination with an 8051 or 8751 microcontroller 42. When used with an 8751 controller 42, the I/O controller 32 appears to the processor 10 as an 8042-type microcontroller as commonly used as a keyboard controller in a conventional desktop personal computer. Thus the I/O controller ASIC 32 contains certain elements to mimic the register set and which are accessible by the 8751 controller 42. In this manner the 8751 controller 42 need not perform many of the actual conventional 8042 keyboard controller low level functions, such as the keyboard and aux port serial communications, as these functions are done in the I/O controller ASIC 32 to relieve the burdens on the 8751 controller 42.

In the first embodiment, the 8751 controller 42 is connected to a serial EEPROM 44. Preferably the serial EEPROM 44 is small but still contains enough space for an entire copy of the data in the CMOS memory 17 which is contained in the combo I/O chip 16. Preferably the serial EEPROM 44 contains 128 16 bit storage locations, each location being individually addressable and erasable. The 8751 controller 42 is properly connected to the serial EEPROM 44 according to the manufacturer's instructions to allow programming and serial communication of data.

A hard disk interface 46 is also connected to the bus 14 to allow the processor 10 to interface with a hard disk drive 48 for mass storage.

The computer C also includes a power supply. A DC/DC power supply 50 provides the necessary voltages used in the computer C, such as +3.3, +5, +12, −30 and a voltage provided to the CMOS memory 17 and the RTC 19. The CMOS/RTC voltage is provided separately to allow the remaining components of the computer C to be powered off to allow the computer C to be placed in a very low power standby condition. The DC/DC power supply 50 is connected to a main battery 52 of the computer C and a small auxiliary battery 54. It is noted that the main battery 52 is a relatively large capacity battery and is removable, while the auxiliary battery 54 is preferably a much smaller battery with only a limited capacity and is not removable. Thus it is noted that should the main battery 52 be removed and the auxiliary battery 54 be discharged, there is no other source of energy to the DC/DC power supply 50 (assuming an external power source is not connected), so that the voltage provided to the RTC 19 and CMOS memory 17 would not be adequate and they would not be operational. However, in the first embodiment the serial EEPROM 44 or in the second embodiment the flash EEPROM 28 would still be retaining a copy of the CMOS memory data even under the no battery power condition.

Figure 2:
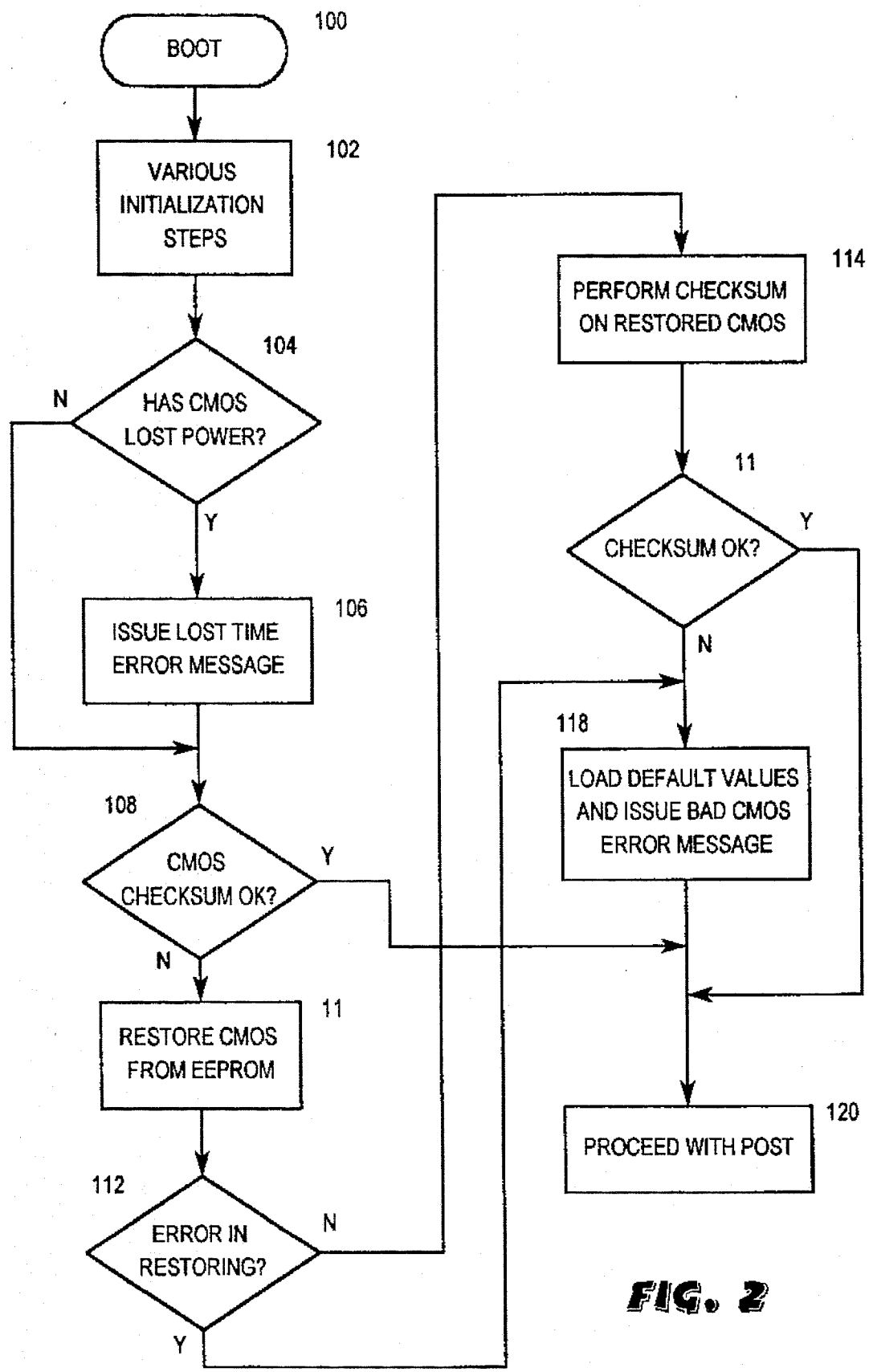
FIG. 2 is a flowchart of portions of the boot routine of the computer of FIG. 1.

Turning now to FIG. 2, a flowchart of the booting process of the computer system C is shown. The boot sequence 100 commences at step 102, where various initialization steps are performed. After the various initialization steps, which are well known to those skilled in the art, are performed, control proceeds to step 104 to determine if the CMOS memory 17 and RTC 19 have lost the power. This is preferably done by checking a power fail flag present in the RTC 19, as conventional. If the power has been lost, this is an indication that the RTC 19 will no longer have an accurate time, so control proceeds to step 106 to issue a lost time error message which is displayed on the appropriate display, either the LCD 24 or the monitor 26. If the CMOS memory 17 has not lost power or after the error message is displayed in step 106, control proceeds to step 108 to determine if the CMOS checksum is satisfactory. According to conventional practice, checksums are maintained in the CMOS memory 17 for both the standard and extended areas to allow an integrity check. If the checksums are not proper, then either the power has been lost or the CMOS memory 20 is faulty. If the CMOS checksums are not okay, control proceeds from step 108 to step 110, where the information last contained in the CMOS memory 17 is restored from the EEPROM, either the serial EEPROM 44 in the first embodiment or the flash EEPROM 28 in the second embodiment. This process is detailed below. In step 112 a determination is made whether an error occurred in restoring the information from the EEPROM to the CMOS memory 17. If not, control proceeds to step 114, where a checksum is performed on the restored CMOS values. This is an additional check to see if the CMOS memory 17 is operating properly. Control proceeds to step 116 to determine if the checksum was proper. If not, control proceeds to step 118, which is also where control proceeds from step 112 if there was an error in restoring. In step 118 various default values contained in the flash EEPROM 28 are loaded and a bad CMOS error message is provided to the operator. If the checksum was okay in steps 108 or 116 or after step 118, control proceeds to step 120 where the computer system C proceeds with the other operations of the power on self-test (POST) and initialization.

Figure 3:
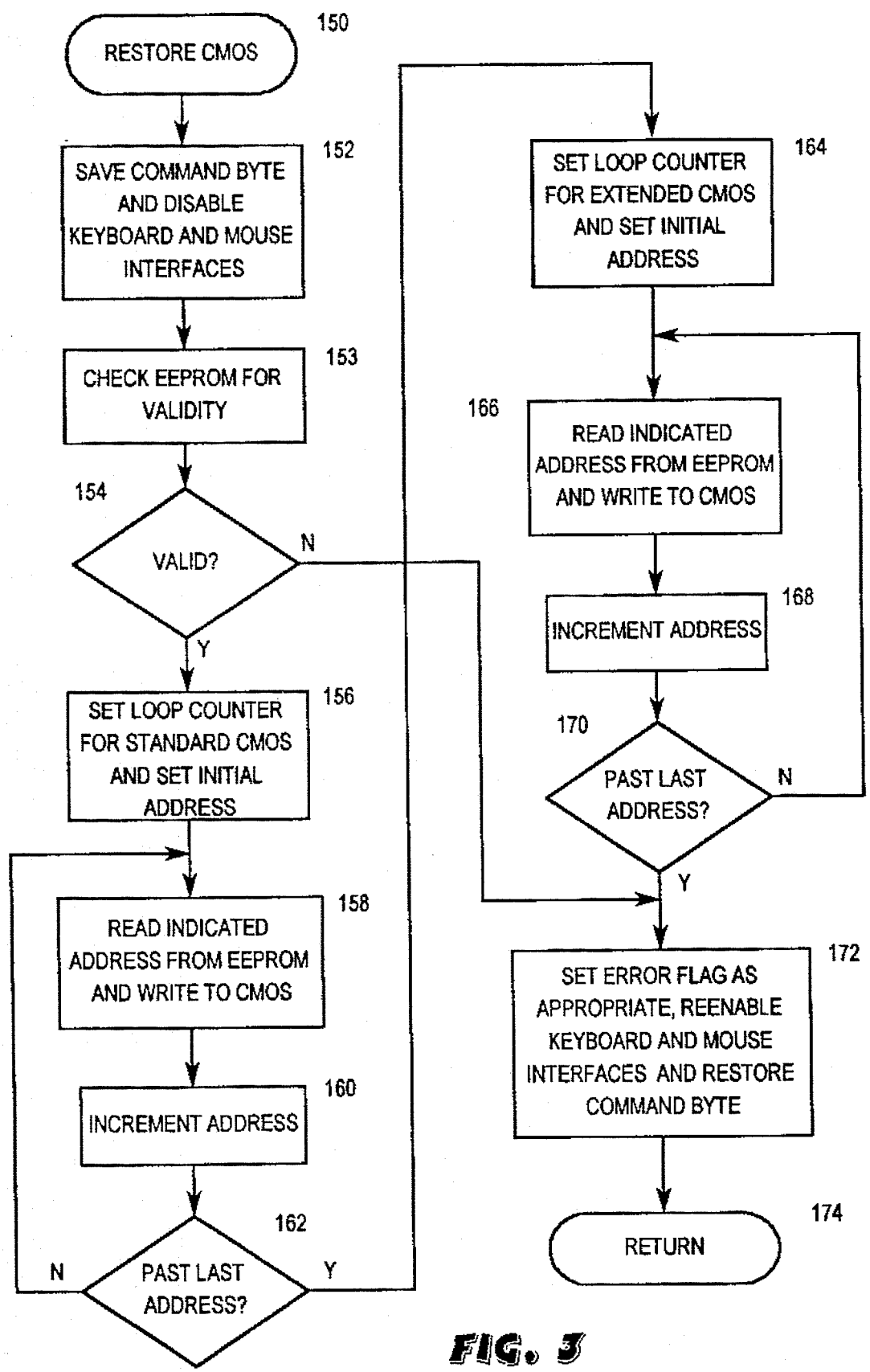
FIG. 3 is a first embodiment of a flowchart of a routine to restore CMOS data from storage.

A first RESTORE CMOS sequence 150 (FIG. 3) is utilized when the serial EEPROM 44 is used to store the CMOS data. In a first step 152 in the sequence 150, the computer C saves the command byte which may be present in the keyboard controller, as emulated by the I/O controller ASIC 32, and disables the keyboard and mouse interfaces by the proper commands written to the I/O controller ASIC 32, which are received and executed by the 8751 controller 42. It is necessary to disable the keyboard and mouse interfaces so that spurious information is not obtained from those devices while the information is being retrieved from the serial EEPROM 44. Control then proceeds to step 153, where a command is issued to the I/O controller ASIC 32 and 8751 controller 42 to read a particular value in the serial EEPROM 44. If this value, preferably the location 0Fh, contains a preset value, this is an indication that data has been properly stored in the serial EEPROM 44 in prior operations and can be retrieved. Control proceeds to step 154 to determine if the EEPROM data is valid. If so, control proceeds to step 156 where a loop counter equal to the number of bytes of the standard CMOS locations is set and the initial address for those locations in the CMOS memory 17 is provided. In a conventional situation this would be 112 bytes at addresses 10h–7Fh. Control then proceeds to step 158 where a command is issued to read the indicated address from the serial EEPROM 44. When this data is obtained, it is written to the CMOS memory 17 at the indicated address. Control proceeds to step 160 where the address is incremented. Control proceeds to step 162 to determine if the last address in the standard CMOS area has been obtained. If not, control returns to step 158 and the loop continues.

When the last address of the standard CMOS area has been obtained, control proceeds to step 164 where a loop counter is set to a value appropriate to receive the number of bytes in the extended CMOS area, in the conventional case 128 bytes, and an address pointer is set to the initial address of the extended CMOS. In the conventional case this is 00h. Control then proceeds to step 166 where a read instruction is issued to read the data value at the indicated address plus 128 from the EEPROM 44 and when this value is obtained by the processor 10 it is then written to the extended area of the CMOS memory 17. The address shift by 128 is necessary when addressing the serial EEPROM 44 to prevent overwriting or rereading the standard CMOS data. Control proceeds to step 168 where the address value is incremented. Control proceeds to step 170 to determine if the increment has rolled the address value past the last address of the extended CMOS area. If not, control returns to step 166 and the read and write loop continues.

If past the last address in step 170 or if the serial EEPROM 44 data was not valid in step 154, control proceeds to step 172 where various error flags are set as appropriate, an error if not valid or no error if all the information has been properly retrieved, the keyboard and mouse interfaces are reenabled and the command byte is restored to the I/O controller ASIC 32 to set it back as it was prior to the RESTORE CMOS operation. Control then proceeds to step 174 which is a return from the sequence 150 so that step 112 of FIG. 2 can be executed.

Figure 4:
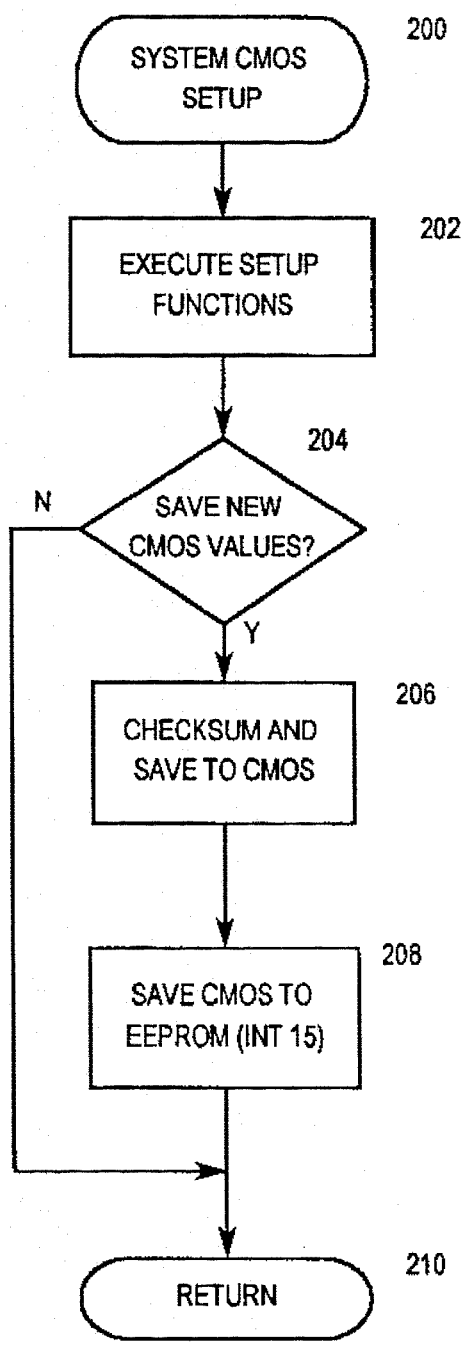
FIGS. 4 and 5 are flowcharts of setup routines to save the CMOS values to the EEPROM memory of FIG. 1.

Of course, prior to retrieving information from the serial EEPROM 44, it is necessary to store data in the serial EEPROM 44. The first place this is done is in the system CMOS setup sequence 200 (FIG. 4). This sequence 200 begins at step 202, where the various conventional setup functions are performed. For example, the computer C may ask the user to indicate the time, type of hard drive, the amount of memory, the type of floppy drive and location, the presence of any serial ports and other system configuration information. After the configuration information has been obtained, control proceeds to step 204 to determine if the user has requested that the new values be saved for later use. If so, control proceeds to step 206 where checksums are performed for the standard and extended areas and the new values are stored to the CMOS memory 17. Control then proceeds to step 208 where the CMOS memory information is transferred to the EEPROM, preferably by the use of an INT 15 call. This operation is detailed below. Control then proceeds to step 210, which is also where control proceeds if the CMOS values of step 204 were not to be saved. Step 210 is a return which exits the setup sequence.

Figure 5:
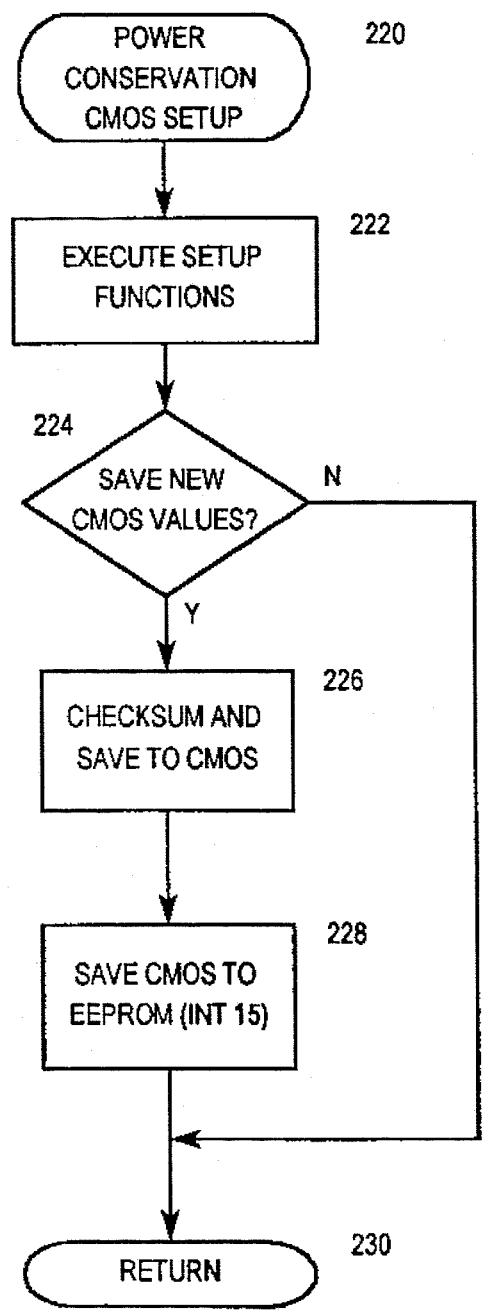

A power conservation CMOS setup sequence 220 (FIG. 5) operates similarly. In step 222 the various setup functions are executed so that the user can indicate the desired power conservation level. Control proceeds to step 224 to determine if the user has indicate that the new values are to be saved. If so, control proceeds to step 226 where the checksums are obtained and the information is saved to the CMOS memory 17. Control then proceeds to step 228 where the CMOS memory information is transferred to the EEPROM 44 by use of INT 15. If the values were not to be saved in step 224 or after step 228, control proceeds to step 230 which is a return and indicates termination of the sequence 220.

Figure 6:
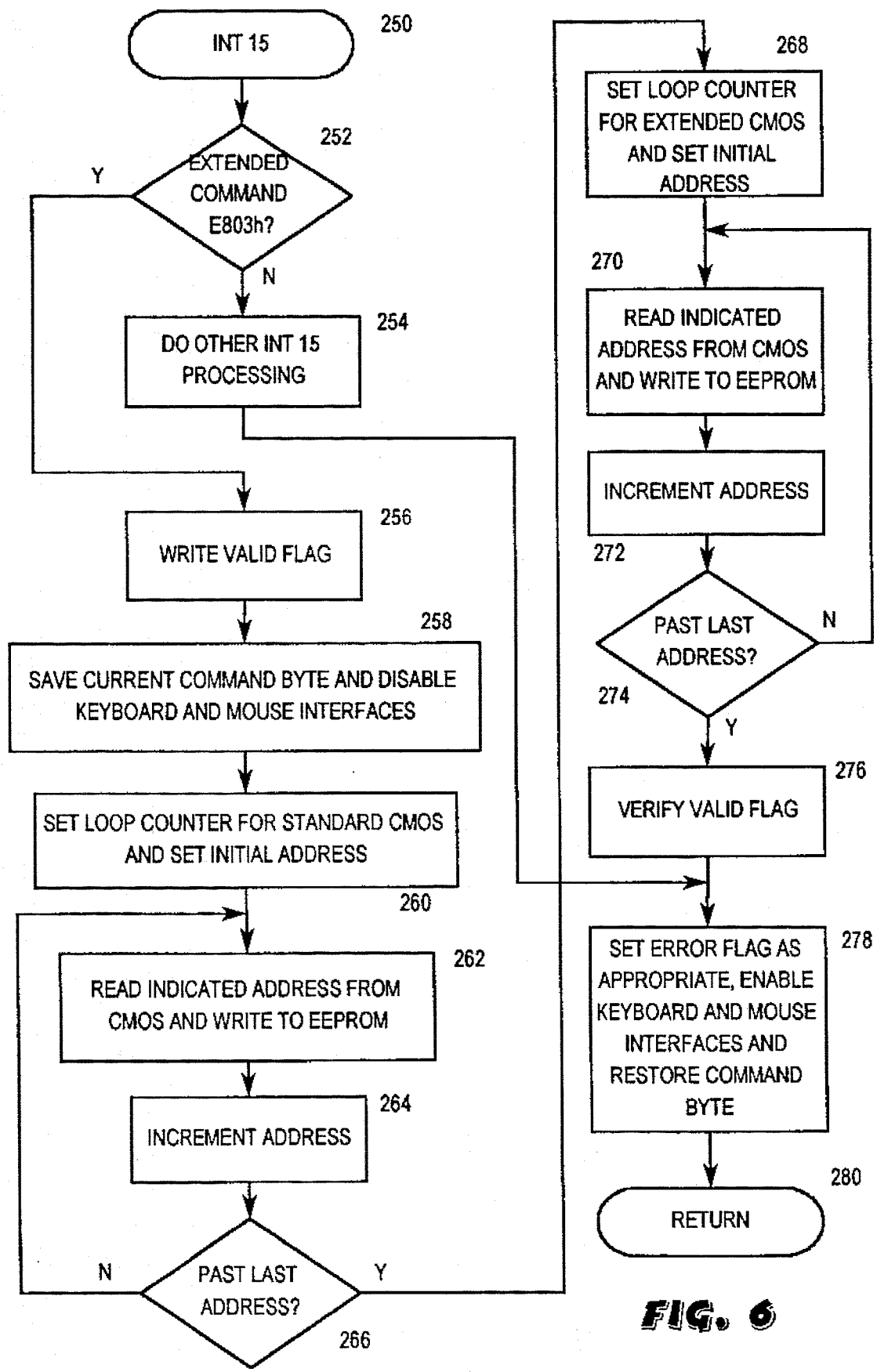
FIG. 6 is a flowchart of an embodiment of the INT 15 command having a new extended command to write the CMOS data to the serial EEPROM of FIG. 1.

FIG. 6 illustrates the flowchart of pertinent portions of the INT 15 sequence 250 when the serial EEPROM 44 is used. The INT 15 sequence is an extended interrupt sequence and conventionally has a large number of particular system specific commands and other miscellaneous commands as well know to those skilled in the art. For purposes of this explanation, only the particular command of interest is illustrated for simplicity and clarity. The INT 15 sequence 250 as one of its steps such as step 252 determines if the extended command E803h, which is an arbitrary selection, has been requested. If not, in step 254 the sequence 250 does other INT 15 processing as appropriate. If the extended command E803h has been received, control proceeds to step 256, where the valid flag is written to the serial EEPROM 44 to indicate that it will contain proper data. Preferably this is a preset value written to location 0Fh of the standard CMOS portion. Control proceeds to step 258, where the current command byte is saved and the keyboard and mouse interfaces are disabled. Control proceeds to step 260 to set a loop counter equal to the number of bytes in the standard CMOS area and the initial address for the standard CMOS area is set. Control proceeds to step 262 where the particular address indicated in the standard portion of the CMOS memory 17 is read. This data value is then written to the serial EEPROM 44 at that address by the proper command to the I/O controller ASIC 32 and the 8751 controller 42. Control proceeds to step 264 and increments the address. Control proceeds to step 266 to determine if the increment has caused the address to go past the last address of the standard CMOS range. If not, control returns to step 262 and the process continues.

When the last value in the standard CMOS area has been transferred to the serial EEPROM 44, control proceeds from step 266 to step 268, where the loop counter is set for operation for the extended CMOS area and the appropriate initial address developed. Control proceeds to step 270, where the indicated address is read from the extended CMOS area and written to the serial EEPROM 44, with the written address being shifted by 128 locations, as noted above. Control proceeds to step 272, where the address value is incremented. In step 274 a determination is made if the data at the last address has been transferred. If not, control returns to step 270. If so, control proceeds to step 276 where the valid flag contained in the serial EEPROM 44 is read to verify that it is present. This would otherwise indicate that the data may not have been properly saved. Control proceeds to step 278, where an error flag is set as appropriate, such as if the valid flag did not return verified, the keyboard and mouse interfaces are reenabled and the command byte is restored. Control then proceeds to step 280, which is a return from the INT 15 sequence 250.

Figure 7:
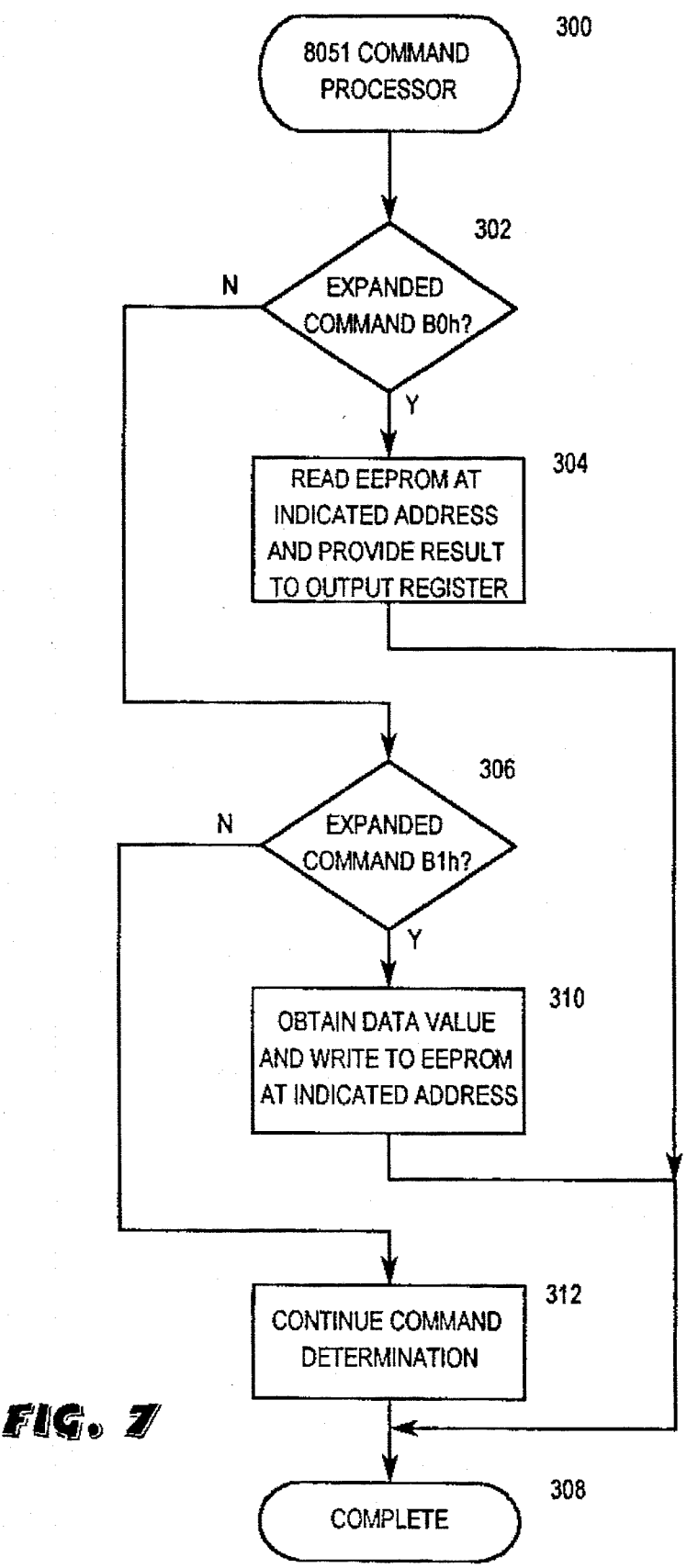
FIG. 7 is a flowchart of command operations in the keyboard controller microcomputer of FIG. 1 to save and restore CMOS data.

As indicated in the description of FIG. 1, the serial EEPROM 44 is connected to the 8751 controller 42. As a result, certain sequences must be performed by the 8751 controller 42 to actually allow data transfer with the serial EEPROM 44. The 8051 command processor sequence 300 of FIG. 7 illustrates only the appropriate commands necessary to illustrate the present invention. In step 302, the 8751 microcontroller 42 determines if the expanded command B0 has been received from the processor 10 via the I/O controller ASIC 32. If so, the 8751 controller 42 reads the serial EEPROM 44 at the indicated effective CMOS address and provides the result to its output register in the I/O controller ASIC 32 which is then read by the processor 10. Control then proceeds to step 308 as the command processing is completed.

If the expanded command B0 was not received in step 302, control proceeds to step 306 to determine if the expanded command B1 had been received. If so, control proceeds to step 310, where the data value is obtained from the data register in the I/O controller ASIC 32 as provided by the processor 10 and this value is written to the serial EEPROM 44 at the indicated effective CMOS address. Control proceeds to step 308. If it is not the expanded command B1 in step 306, control proceeds to step 312, where command determination is continued. After step 312 control proceeds to step 308.

Figure 8:
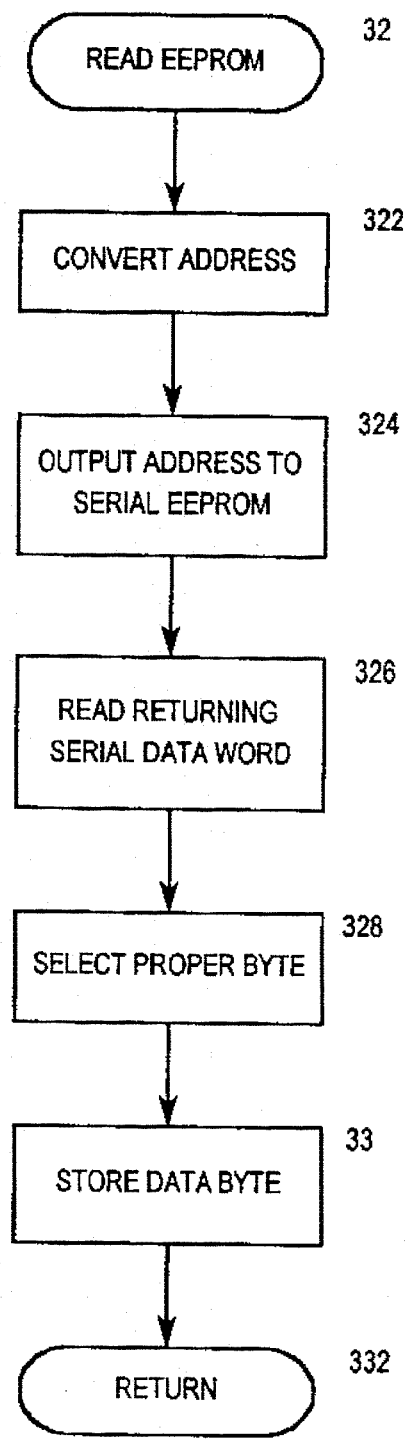
FIG. 8 is a flowchart of a routine for the keyboard controller microcomputer of FIG. 1 to read the serial EEPROM.
Figure 9:
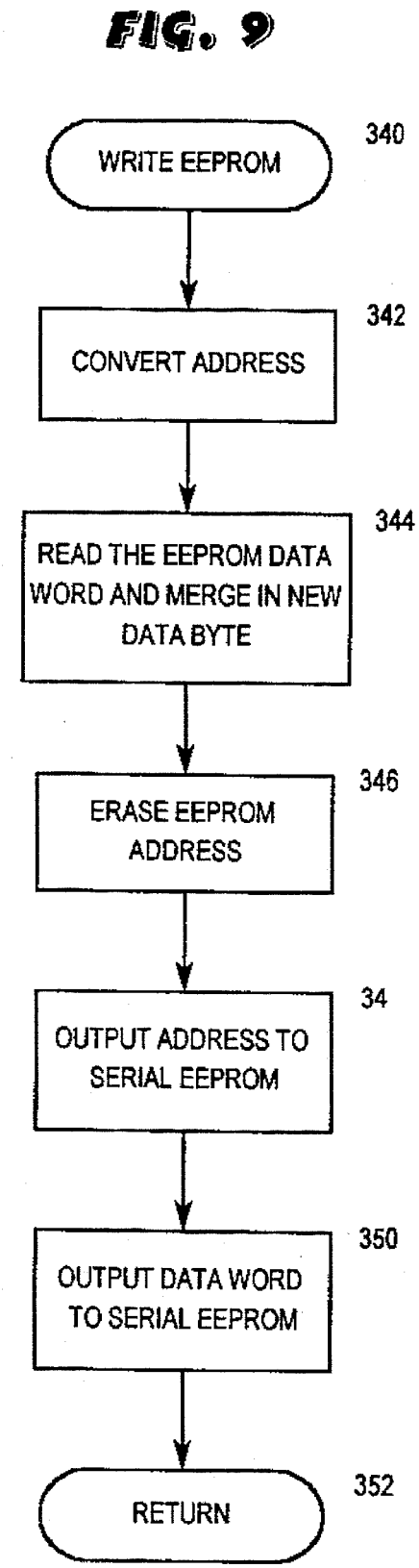
FIG. 9 is a flowchart of a routine to allow the keyboard controller microcomputer of FIG. 1 to write information to the serial EEPROM.

Two sequences, the read EEPROM sequence 320 (FIG. 8) and the write EEPROM sequence 340 (FIG. 9) are used by the 8751 microcontroller 42 to actually read or write a byte to the serial EEPROM 44. The read EEPROM sequence 320 commences at step 322 where the CMOS address is converted to a serial EEPROM address. The preferred embodiment utilizes a serial EEPROM 44 having 128 locations 16 bits wide for storing data, whereas the CMOS address provided is a byte-based address. To this end the address must be converted to an appropriate word-based address for use by the serial EEPROM 44. In step 324 this address is output in serial fashion to the serial EEPROM 44 as appropriate and a read operation is indicated. In step 326 the returned serial data word being provided from the serial EEPROM 44 is read by the 8751 controller 42. In step 328 the proper byte that was returned is selected and in step 330 this data byte is stored in the data register for reading by the processor 10. Control proceeds to step 332, where the sequence 320 returns.

The write EEPROM sequence 340 commences at step 342 by converting the CMOS address to a word-based address. In step 344, the address is provided to the serial EEPROM 44 as part of a read operation, preferably using the read EEPROM sequence 320, to read the entire data word. In step 344, the new data byte is merged into this word so that a full word is obtained. In step 346 a command is sent to the serial EEPROM 44 to erase the selected address. In step 348, the address of the data word to be written is provided to the serial EEPROM 44 with a write command and in step 350 the actual data word is provided to the serial EEPROM 44. In step 352 the sequence 340 ends by returning to the calling sequence, such as step 310.

Figure 10A:
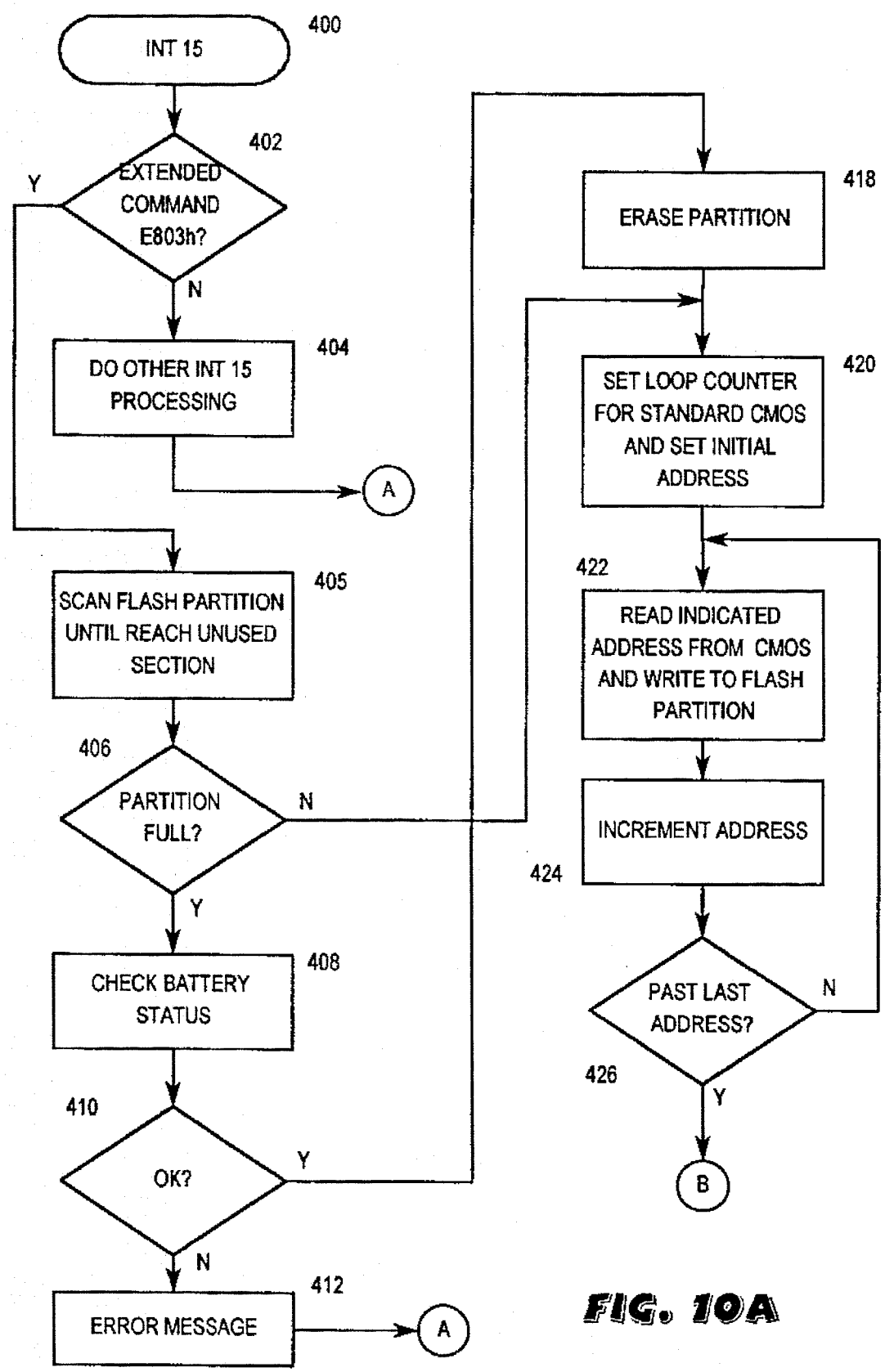

As noted above, in an alternate or second embodiment the serial EEPROM 44 is not utilized and a partitioned flash EEPROM 28 is utilized. This would be preferred in all cases except that availability of the particular parts can be limited at times and so by providing the serial EEPROM 44, this part shortage need not limit manufacture of the computer C. However, should the parts become readily available, then the alternative embodiment would be utilized in production. In this embodiment the alternate INT 15 command sequence 400 (FIG. 10A) is executed, rather than the INT 15 sequence 250 previously described. Again portions not pertinent are not illustrated. In step 402 a determination is made if the extended command E803h is received. If not, control proceeds to step 404 where other INT 15 processing occurs. If the E803h command was received, control proceeds to step 405, where the selected partition of the flash EEPROM 28 used for CMOS data storage is scanned until an unused portion is obtained. To conserve the number of erase cycles necessary, the partition is sufficiently large to contain a plurality of copies of the CMOS data. By sequentially providing them one after the other in the partition and not overlaying each other, the CMOS data can be written to the flash EEPROM without requiring erasure for each operation. To this end it is necessary in step 404 to reach the unused section so that the new copy can be written. Control proceeds to step 406 to determine if the partition is full so that another copy of the CMOS data cannot be completely written to the partition. If so, control proceeds to step 408 to determine the status of the main battery 52 and the auxiliary battery 54. This is necessary because the CMOS data will be completely erased from the flash EEPROM 28 and it is appropriate to make sure that there will be sufficient power to the CMOS memory 17 itself to prevent the very condition to be solved i.e. loss of power to the CMOS memory 17. If the batteries 52 and 54 are not sufficiently charged as determined in step 410, an error message is indicated in step 412 to indicate that CMOS information cannot be stored as the batteries are not sufficiently charged. Control proceeds from step 412 to step 414 where any necessary error flags are set and then to step 416, which is a return from the INT 15 sequence 400.

If the battery status was satisfactory in step 410, control proceeds to step 418 where a command is given to the flash EEPROM 28 to erase the partition. Control then proceeds to step 420, which is also where control proceeds if the partition was not full. In step 420 a loop counter is set equal to the number of bytes in the standard CMOS portion and the initial standard CMOS address is set. Control proceeds to step 422, where a read operation is performed from the CMOS memory 17 at the indicated CMOS address and this value is written to the partition in the flash EEPROM 28. In this case, the processor 10 would directly write to the flash EEPROM 28 at the start of the unused section of the flash EEPROM 28 as previously determined in step 404 or the beginning after erasure and offset by the address provided for the CMOS memory 17. Control then proceeds to step 424, where the address is incremented. In step 426 it is determined if the data at the last address has been written. If not, control returns to step 422 and the writing of the standard CMOS data is continued.

If the data at the last address had been written, control proceeds to step 428 (FIG. 10B) where the loop counter is set for the extended CMOS area and the proper initial address for the extended CMOS area is set. Control proceeds to step 430 where the indicated address is read from the CMOS memory 17 and written to the next location in the partition after the standard CMOS data just written. In this case the extended CMOS memory address is used as an offset to the copy base address plus the number of standard CMOS values. Control proceeds to step 432 where the address is incremented. In step 434 a determination is made if the last address had been read and if not, control returns to step 430. If so, control proceeds to step 414 to set appropriate error flags and then to return in step 416.

The RESTORE CMOS sequence 450 (FIG. 11) is used in this alternate embodiment. Control starts at step 452, where the flash partition containing the CMOS data is scanned until an unused portion is reached or the end is reached. In step 454, this flash partition address is then decremented by the value indicating the number of bytes stored each time the CMOS values are stored, preferably 240 bytes. This provides the starting address for the latest copy of the saved CMOS data. Control then proceeds to step 456, where the CMOS information is retrieved from the partition flash EEPROM 28. This is done by simply reading the address, converting the address to a desired CMOS area address and then writing it to the CMOS memory 17. This is completed for all of the locations of both the standard and extended CMOS areas.

In this manner it is seen that by the use of the EEPROM memory 44 or 28, that no battery need be provided to the CMOS memory 17 and yet the data will be retained, even though the main battery 52 is removed and the auxiliary battery 54 is inadequate to power the computer C. While the actual time might be lost, this is not as significant because the proper date and time are readily obtainable, whereas much of the other configuration information, such as hard drive type, modem status, and so on, are not readily available to a user. Thus the more critical and difficult to obtain information is saved, whereas the easily obtained time information needs to be provided. Thus the cost, space and weight of the battery for the CMOS memory 17 and RTC 19 can be saved without danger of loss of configuration information.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system, comprising:

a CMOS memory for storing computer system configuration information, said CMOS memory having a power input, wherein said configuration information includes power conservation information;

a programmable, nonvolatile integrated circuit memory for storing information stored in said CMOS memory;

a DC to DC power supply having outputs to power the computer, including one connected to said CMOS memory power input, wherein said power to said CMOS memory is provided only by said DC to DC power supply, and having at least one input for receiving DC power, said input for connecting to only power sources intended for providing power to the complete computer system;

a main battery connected to said DC to DC power supply input for providing power to the complete computer system; and means for transferring information between said CMOS memory and said programmable, non-volatile integrated circuit memory.

2. The computer system of claim 1, wherein said means for transferring information between includes:

a processor coupled to said CMOS memory and to said programmable, non-volatile integrated circuit memory;

means for instructing said processor to transfer data from said CMOS memory to said programmable, non-volatile integrated circuit memory; and means for instructing said processor to transfer data from said programmable, non-volatile integrated circuit memory to said CMOS memory.

3. The computer system of claim 2, wherein said means for transferring information between further includes:

means for determining if said CMOS memory is valid; and means for activating said means for instructing said processor to transfer data to said CMOS memory if said CMOS memory is not valid.

4. The computer system of claim 2, wherein said means for transferring information between further includes:

means for obtaining values for the configuration information from a user;

means for determining if the user has selected to save said obtained configuration information in said CMOS memory; and means for activating said means for instructing said processor to transfer data to said programmable, non-volatile integrated circuit memory if the user has selected to save said obtained configuration information.

5. The computer system of claim 4, wherein said means for transferring information between further includes:

means for determining if said CMOS memory is valid; and means for activating said means for instructing said processor to transfer data to said CMOS memory if said CMOS memory is not valid.

6. The computer system of claim 5, wherein said programmable, non-volatile integrated circuit memory is a flash electrically erasable programmable read only memory having a plurality of partitions and said CMOS memory information is stored in one partition, and said one partition is sized to receive a plurality of copies of said CMOS memory information, wherein said means for instructing said processor to transfer data from said CMOS memory includes means for determining if unused space remains in said one partition and writing said CMOS memory information to the beginning of said unused space and erasing said one partition if said one partition has no unused space, and wherein said means for instructing said processor to transfer data from said programmable, non-volatile integrated circuit memory determines the beginning of unused space in said one partition and transfers the CMOS memory information immediately preceding said unused space.

7. The computer system of claim 1, wherein said programmable, non-volatile integrated circuit memory is a serial electrically erasable programmable read only memory.

8. The computer system of claim 1, wherein said programmable, non-volatile integrated circuit memory is a flash electrically erasable programmable read only memory.

9. The computer system of claim 8, wherein said flash electrically erasable programmable read only memory includes a plurality of partitions and said CMOS memory information is stored in one partition.

10. The computer system of claim 9, wherein said flash electrically erasable programmable read only memory further stores basic operating code in a second partition.

11. A method of operating a computer system without a separate battery for a CMOS memory, the computer system having a programmable non-volatile integrated circuit memory and a CMOS memory, the CMOS memory used for storing computer system configuration system information, the method comprising the steps of:

obtaining configuration information from a user;

storing said obtained configuration information in the CMOS memory;

storing a copy of the information in the CMOS memory in the programmable, non-volatile integrated circuit memory;

upon powering up said computer, checking the validity of the CMOS memory; and if the CMOS memory is not valid, retrieving said information stored in the programmable, non-volatile integrated circuit memory as said configuration information.

12. The method of claim 11, wherein said programmable, non-volatile integrated circuit memory is a flash electrically erasable programmable read only memory having a plurality of partitions and said CMOS memory information is stored in one partition, and said one partition is sized to receive a plurality of copies of said CMOS memory information, wherein said step of storing a copy in said programmable, non-volatile integrated circuit memory includes the steps of determining if unused space remains in said one partition, writing said CMOS memory information to the beginning of said unused space and erasing said one partition if said one partition has no unused space, and wherein said step of retrieving said information includes determining the beginning of unused space in said one partition and transferring the CMOS memory information immediately preceding said unused space.

* * * * *